(12) United States Patent
Alvarez (10) Patent No.: US 7,269,220 B2
(45) Date of Patent: *Sep. 11, 2007

(54) ADAPTIVE MOTION DETECTION AND CONTROL

(75) Inventor: José Roberto Alvarez, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 786 days.

This patent is subject to a terminal disclaimer.

(21) Appl. No.: 10/196,701

(22) Filed: Jul. 16, 2002

(65) Prior Publication Data

US 2004/0012722 A1 Jan. 22, 2004

(51) Int. Cl.
*H04B 1/66* (2006.01)
(52) U.S. Cl. .................................. 375/240.12
(58) Field of Classification Search ........... 375/240.12, 375/240.16, 240.29; 348/699, 448, 607; H04B 1/66
See application file for complete search history.

(56) References Cited

U.S. PATENT DOCUMENTS

| 5,519,456 | A | * | 5/1996 | Inamori ...................... 348/699 |
| 5,731,832 | A | | 3/1998 | Ng |
| 5,793,435 | A | * | 8/1998 | Ward et al. .................. 348/448 |
| 5,796,437 | A | * | 8/1998 | Muraji et al. ............... 348/452 |
| 5,886,745 | A | * | 3/1999 | Muraji et al. ............... 348/448 |
| 6,157,396 | A | * | 12/2000 | Margulis et al. ............ 345/506 |
| 6,493,041 | B1 | * | 12/2002 | Hanko et al. ................ 348/699 |
| 6,831,948 | B1 | * | 12/2004 | Van Dijk et al. ....... 375/240.12 |
| 6,987,882 | B2 | * | 1/2006 | Curry et al. ................ 382/173 |
| 7,034,892 | B2 | * | 4/2006 | Ojo et al. ................... 348/607 |
| 7,050,501 | B2 | * | 5/2006 | Alvarez ................. 375/240.16 |

FOREIGN PATENT DOCUMENTS

| EP | 0643533 | 3/1995 |
| EP | 0654941 | 5/1995 |
| EP | 1096791 | 5/2001 |

OTHER PUBLICATIONS

N. R. Harvey et al., *Application of Non-linear Image Processing : Digital Video Archive Restoration*, IEEE (1997) 731-734, University of Strathclyde, Scotland.
Si Jun Huang, *Adaptive Noise Reduction And Image Sharpening For Digital Video Compression*, IEEE (1997) 3142-3147, Scientific-Atlanta Inc., USA.

* cited by examiner

*Primary Examiner*—Tung Vo
(74) *Attorney, Agent, or Firm*—McAndrews, Held & Malloy, Ltd.

(57) ABSTRACT

A motion detector (300) detects motion of images represented by video pixels by providing a memory (19) arranged to store first pixels processed during a first time period. The motion detector (300) responds to differences between the first pixels and second pixels processed during a second time period after the first time period to generate initial motion signals. A look up table (362) and an edge detector (364) modify the initial motion signals to generate the output motion signals.

30 Claims, 5 Drawing Sheets

ADAPTIVE MOTION DETECTION AND CONTROL

BACKGROUND OF THE INVENTION

This invention relates to detection of motion of images represented by video pixels and other digital data.

One application of this invention is useful in connection with digitally removing noise from video sequences that have been digitized from the analog domain in order to increase the efficiency of a digital video compression system. Other applications of the invention are useful in connection with deinterlacing (line doubling) systems, and with comb filtering systems.

Some known temporal filters derive motion information from both luminance and chrominance separately, not taking advantage of the correlation between the two signals.

Prior art systems have failed to recognize the utility of a median filter operation in the motion detection path which is used to eliminate impulses not in the image domain but in the motion/temporal domain. This operation makes a recursive filter perform better by controlling the value of the coefficient that controls the recursive time constant of the filter itself.

There are known temporal noise reduction systems that use motion estimation techniques instead of motion detection techniques. However, the motion estimation process is complex and does not fully guarantee the elimination of noise, just reduction.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful detecting motion represented by video pixels having digital pixel values. In such an environment, the apparatus comprises a memory arranged to store filtered pixel first values corresponding to first pixels processed by the apparatus during a first time period, and a motion detector responsive to differences between the first values and pixel second values corresponding to second pixels processed by the apparatus during a second time period later than the first time period to generate motion signals representing detected motion of images represented by the first pixels relative to motion of images represented by the second pixels.

One method embodiment of the invention is useful for detecting motion represented by video pixels having digital pixel values. In such an environment, the method comprises storing filtered pixel first values corresponding to first pixels processed during a first time period and generating motion signals in response to differences between the first values and pixel second values corresponding to second pixels processed during a second time period later than the first time period, the motion signals representing detected motion of images represented by the first pixels relative to motion of images represented by the second pixels.

By using the foregoing techniques, motion detection can be accomplished with a degree of ease and accuracy previously unavailable.

These and other advantages and novel features of the present invention, as well as details of an illustrated embodiment thereof, will be more fully understood from the following description and drawings.

DETAILED DESCRIPTION OF THE INVENTION

In general, the motion detection module shown in the Figures converts frame-based temporal differences into a facsimile of motion between like-fields of video across video frames. The motion detected from the frame differences is also used to derive temporal characteristics of the video sequence in order to direct the behavior of other functions in the system. Chrominance motion information is derived from luminance motion information and is qualified by a series of dynamic parameters that take advantage of correlation between chrominance and luminance data.

Additional details about the motion detection module and other aspects of the various embodiments are described in the application entitled "Digital Noise Reduction Techniques," filed on the same day as this application in the name of Jose Alvarez under Ser. No. 10/196,477 and incorporated by reference in its entirety into this application.

The motion detection module detects edge transitions in the motion signal in order to temporarily change the time constant of the recursive filter in order to further prevent temporal blurring, also known as ghosting (a common artifact byproduct of improperly implemented recursive filters). Furthermore, the embodiments make use of a median operator acting directly on the motion signal in order to detect impulses in the motion signal that may be caused by spurious noise in the input video signal.

The input video sequence is analyzed specifically to detect impulsive noise in order to control the impulsive noise reduction filters. Furthermore, the input video sequence is also analyzed to detect moving edges in order to control the time constant of the recursive temporal filter structure.

A dynamic process is one which is controlled by firmware according to information gathered over time. The firmware may control the process at various places, such as a video field boundary or a horizontal video line time. An example is the change in the general form of the motion look-up table shown in FIG. 2 according to the amount of total motion detected over a period of time. This period can span several fields. In this particular example and according to one definition, the hardware continues to make motion-adaptive decisions regarding the recursive time constant for each pixel, but the overall shape of the motion transform function is controlled (loaded) dynamically (as needed) by the firmware.

The blocks shown in the drawings may be implemented by a combination of hardware capabilities and firmware intervention based on hardware assistance.

Figure 1:
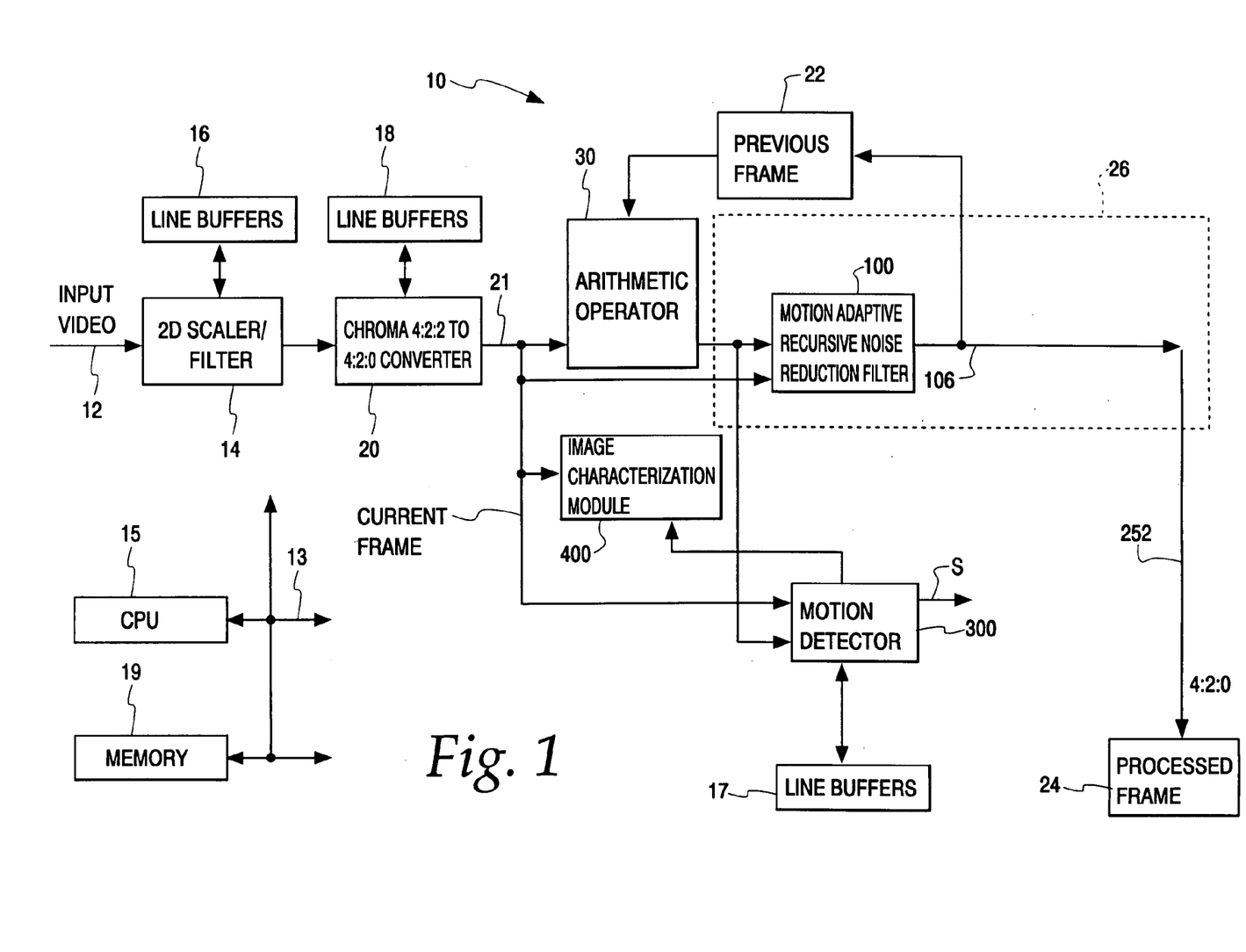
FIG. 1 is a schematic bock diagram of a motion detection and noise reduction system made in accordance with one embodiment of the invention.

FIG. 1 describes a preprocessor system 10 that processes input digital video pixels having digital pixel values received on an input 12. This process involves changing picture size, converting to MPEG color space, and noise reduction. The entire process is under the control of a central processing unit 15 that stores data in a memory 19. The CPU 15 is coupled to each of the blocks shown in FIG. 1 through one or more busses 13. To avoid cluttering FIG. 1, the connection of the busses to the various blocks has been omitted from the drawing. This specification describes ways of reducing random noise generated by low quality video signal sources, typically converted from the analog domain.

One way of reducing noise is to perform spatial filtering, such as the spatial filtering performed by a 2D scaler/filter 14. This type of noise reduction can be effective but leads to loss of picture detail since it relies on attenuating high frequencies in which random noise is prevalent. A better way of reducing random noise is to use temporal information in the input sequence and filtering the noise in both spatial and temporal domains using linear and non-linear filter structures.

The top-level architecture of a complete motion detection module suitable as input stage to an MPEG encoder is depicted in FIG. 1.

The input to preprocessor system 10 is digital video which has been converted from the analog domain by an analog video decoder (not shown in FIG. 1). To indicate vertical processing, the line buffer blocks 16-18 represent storage elements that may contain adjacent horizontal video lines necessary to perform vertical filtering. There is always a compromise in using internal buffers regarding silicon area and system bus access. It is convenient to store adjacent video lines in local buffers without having to utilize external memory bandwidth in accessing pixels across horizontal lines. For the purpose of this specification, line buffers are used to indicate storage necessary to perform operations along the vertical picture direction.

In many cases, input video must be scaled down depending on the bit rate required for a final display device. A 2D Scaler/Filter module 20 performs both downscaling and spatial filtering, as well as cropping the input video to specific resolutions and bandwidth requirements. The MPEG Encoder will set the size and spatial filtering required for the appropriate video sequence, instantaneous compression factor, and bit stream produced.

Most digital video sources are presented in the YCbCr 4:2:2 color space domain. Since MPEG-2 requires the video to be presented in the YCbCr 4:2:0 domain, it is advantageous to convert to this color space as early as possible in the processing chain in order to decrease memory storage requirements and speed up computations. Since 4:2:2 to 4:2:0 conversion is a vertical downscale operation with very specific phase requirements, it is presented as a separate processing block 20 in FIG. 1.

A previous frame block or buffer 22 holds picture information derived from a processing stage one frame-time in the past. The data written to block 22 is taken out of a motion adaptive recursive noise reduction filter 100. If desired, more than one previous frame block may be stored.

A processed frame buffer 24 contains the completely processed frame and may be input to an MPEG Encoder module (not shown). Thus, buffer 22 stores a frame of pixels processed by preprocessor 10 at a time period earlier than the time period during which preprocessor 10 processes the current frame of pixels transmitted along a path 21. Line buffers 16-18 and frame buffers 22 and 24 form part of memory 19.

Digital video signals are processed in the way they are captured by the analog digitizer, i.e., in the form of interlaced frames of video. Each frame consists of two fields of $\frac{1}{60}^{th}$ of a second duration. Horizontal and vertical synchronization signals derived from the input video are used to coordinate most of the processing operations described in the present architecture. The embodiments shown in the drawings also are effective for progressive sequences (non-interlaced).

The digital signal processing structures described in this specification make the implicit assumption that chrominance (C) is processed in the same manner as luminance (Y), unless otherwise specified. Each chrominance component (Cb, Cr) is processed individually; therefore, filters keep intermediate results for each component.

Chrominance components (Cb Cr) are assumed to be co-sited (sampled at the same time) as the Luminance (Y) component on even sampling locations 0, 2, 4, etc. This assumption does not always hold true because of the wide variance in analog video decoder implementations. Therefore, it is advisable that video interface module at the input of the Scaler/Filter 14 has the capability of swapping color components, offsetting chroma samples and reversing the Y and CbCr sampling order.

Implicit in the Figures is the insertion of matching processing delay elements. One example is the initial motion detection signal mDetect described in following sections. This signal is used to control the processing at various stages, but must be properly delayed to match the corresponding pixel being processed as the video signal travels through the processing elements.

In some sections of this specification, the term "current frame" indicates the luminance and chrominance signals as they are obtained directly from the digital video input port 12.

It is assumed that all signal gain changes are properly saturated and clipped to values 0 to 255, including cases where there could be arithmetic shifts in the left or right directions. All FIR low-pass filters used in described embodiments have positive coefficients that add up to 1.0 (256) and therefore have unity gain at DC. The high-pass filters used are first order with also no gain at DC. Filter coefficients are assumed to be 8-bit quantities. All intermediate computations should be kept at full accuracy and only rounded at interface outputs.

Preprocessor 10 includes a temporal filter 26 comprising frame-recursive IIR type filter 100. Filter 100 is adaptively controlled by the amount of motion detected between images represented by pixels of consecutive frames by a motion detector 300. An image characterization module 400 is also included as shown in FIG. 1. The main purpose of temporal filter 26 is to provide noise reduction for random non-correlated white gaussian type noise.

The random noise in this case is the kind that can be generated from tape recordings, low quality broadcast transmissions, and system electronic noise that corrupts picture quality. This noise also can include what is widely known as snow in images sequences.

Still referring to FIG. 1, the signal flow starts with the YCbCr 4:2:0 input data from the color space converter 20. The input data on path 21 is referred to as the current frame in later sections of this specification. The recursive filter 100 takes both the current and previous frame data and applies filter 100 with a coefficient (time constant).

The image characterization module 400 keeps a record of the amount of motion of images in the current frame represented by pixels of the current frame, as well as a record of the data currently being processed. The main purpose of module 400 is to help the firmware decide on the optimal system parameters on a field-by-field basis. However, in other applications, the firmware may exercise control on a horizontal (i.e., line-by-line) basis.

The recursive filter 100 depicted in FIG. 1 works on the principle that random, uncorrelated noise can be filtered in the temporal domain for those regions of the picture where a neighborhood of pixels has remained essentially static for at least one frame-time. Since only one previous frame is stored, the motion detection of detector 300 is limited to a short period of time, but the effects of filter 100 can last much longer due to the recursive nature of filter 100.

Motion detection by motion detector 300 is based on temporal frame differences, which are calculated by an arithmetic operator 30 that subtracts pixels residing in the same spatial locations, but one frame-time apart. Motion detector 300 takes the temporal frame differences and converts them into motion signals S that represent an estimate of detected motion. More specifically, motion detector 300 generates motion signals S representing detected motion of images represented by pixels of the previous frame relative to the motion of images represented by pixels of the current frame.

Motion detector 300 does not estimate motion, it only detects it. For the purposes of the recursive filter 100, it is only necessary to know regions where there is essentially no motion, medium amount of motion and large amount of motion. The precise value of the motion at every pixel is not as important as the neighborhood amount of motion detected.

Figure 2:
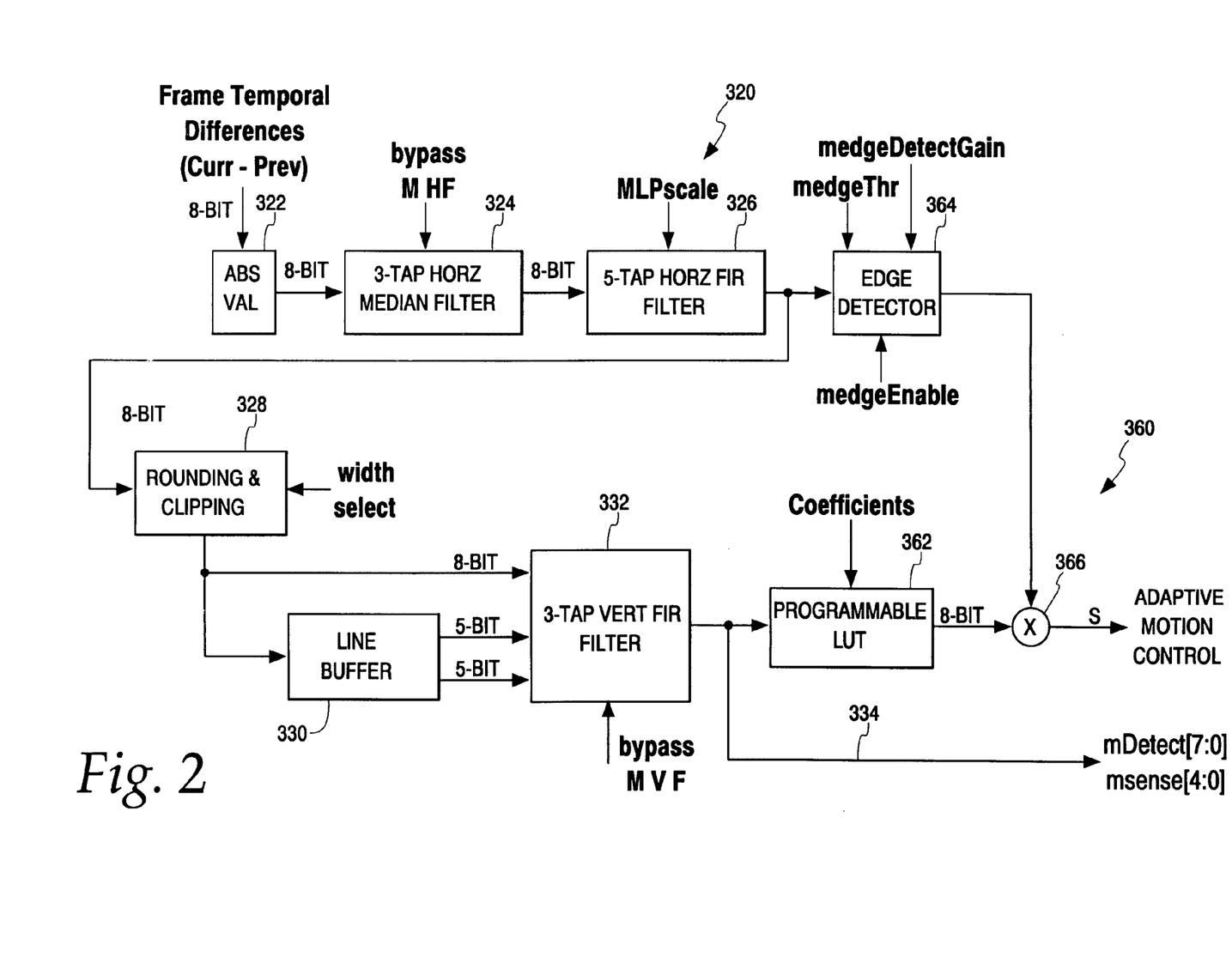
FIG. 2 is a schematic block diagram of the motion detector shown in FIG. 1.

As indicated in FIG. 2, the motion detection is based on the luminance signal. For the great majority of cases, large area luminance motion will be correlated with the chrominance signal.

A motion look-up table 362 (FIG. 2) modifies initial motion signals generated by module 300. Typically, absolute values of the initial motion signals greater than 32 are considered very high motion within the small two-dimensional region processed and therefore the look-up table 362 usually consists of at most 32 entries.

Firmware plays a role in the effective use of motion detector 300. With the help of information gathered by the image characterization module 400, the firmware can change the values of the motion look-up table 362 to better suit the temporal and signal quality nature of the input video pixels. Furthermore, firmware can change the register values that control the gain of S for both the luminance and chrominance components.

As discussed in a previous section, the motion detection signal S is based on the temporal difference between frames. FIG. 2 depicts a block diagram of the motion detector. In FIG. 2, the bit widths indicate the relevant signal information used at each stage. For example, although the 3-tap vertical filter 332 (FIG. 2) operates on 8-bit quantities, since the nature of the frame delta signal is such that its frequency distribution is concentrated largely around low values for most image sequences and because the motion detector detects only small, medium and large motion changes, the relevant information is limited to 5-bits and the programmable LUT is accessed by only 32 values in the illustrated embodiment.

Referring to FIG. 2, motion detector 300 includes a two dimensional (2D) smoothing filter 320 and a programmable transfer function module 360. The 2D smoothing filter 320 generates initial motion signals mDetect on a path 334. As shown in FIG. 2, filter 320 includes an absolute value operator 322, a 3-tap horizontal median filter 324, a 5-tap horizontal finite impulse response (FIR) filter 326, a rounding and clipping operator 328, a line buffer 330 and a 3-tap vertical FIR filter 332 interconnected as shown.

Absolute value operator 322 calculates the absolute value of the difference between the amplitudes of pairs of corresponding pixels from the current frame on path 21 and the previous frame 22.

The 3-tap median filter 324 is used to eliminate spurious pixel-wide motion between frames. The median filter 324 is a simple ranking operator that always selects the value that is numerically in the center of three consecutive motion samples.

The absolute value of the temporal delta signal is low-pass filtered horizontally by filter 326 to further reduce high frequency components due to noise and to generate horizontal filtered signals. Filter 326 uses fixed coefficients that can be realized without multipliers:

Motion Horizontal Low Pass Filter 326: [1, 3, 8, 3, 1]/16

Still referring to FIG. 2, transfer function module 360 includes an edge detector 364, which provides an indication of a horizontal sudden change in the horizontal filtered signals in order to reduce artifacts produced by horizontal motion of high contrast edges in the images represented by the pixels in the current frame. The resulting effect is the improvement of artifacts caused by the application of a high time constant motion look-up table to video that has only localized motion components when high contrast object or image boundaries move across the current frame. Register medgeThr is used by detector 364 to determine what constitutes a motion edge of an image. For practical purposes, and based on simulation results, the value of medgeDetectGain is either 1.0, ½ or 0.0. The effect of medgeDetectGain is to quickly select the strength of the edge with a one-bit value and is limited to the edge boundaries of images, therefore being very short in duration. The edge signals generated by the output of the edge detector 364 are based on the absolute value of a simple horizontal high pass filter:

Motion Edge Detector 364: abs([1, −1]/2)

Using vertical filter 332 for the frame delta signal further helps the conversion to a neighborhood motion detection signal. The output of filter 332 is saturated to 5-bits when used as msense, the input to the motion look-up table 362. The 8-bit initial motion detect signal, mDetect, is used by other modules as a true motion detection signal. The vertical motion filter 332 is implemented as a simple filter with coefficients:

Motion Vertical Low Pass Filter: [1, 2, 1]/4

In order to reduce area requirements and noting that motion look-up table 362 is limited to 32 values, the compromise of storing the saturated 5-bit motion values can be, made. It is clear that this operation will lead to inaccuracies, but many experiments with real video sequences have shown that the final effect in the noise reduction is still much better than simply using the horizontal motion filter 320. This can be explained by the goal, which is to detect motion in a two-dimensional neighborhood of pixels across time; it is not the intention to accurately measure motion since this process is not necessary for successful operation of the simple recursive structure.

The programmable look-up table 362 also is referred to as motion LUT or MLUT in other parts of this specification. The general form of table 362 is a monotonically decreasing function. The function can be either sinusoidal or exponential. Image sequences with large amounts of global motion should use MLUT functions that decay rapidly from the origin. Firmware has the option of changing the complete table at field boundaries or the option of only changing the attenuation factors depending on the nature of the input sequence (derived from information provided by image characterization module 400 and the encoding engine itself).

Figure 3A:
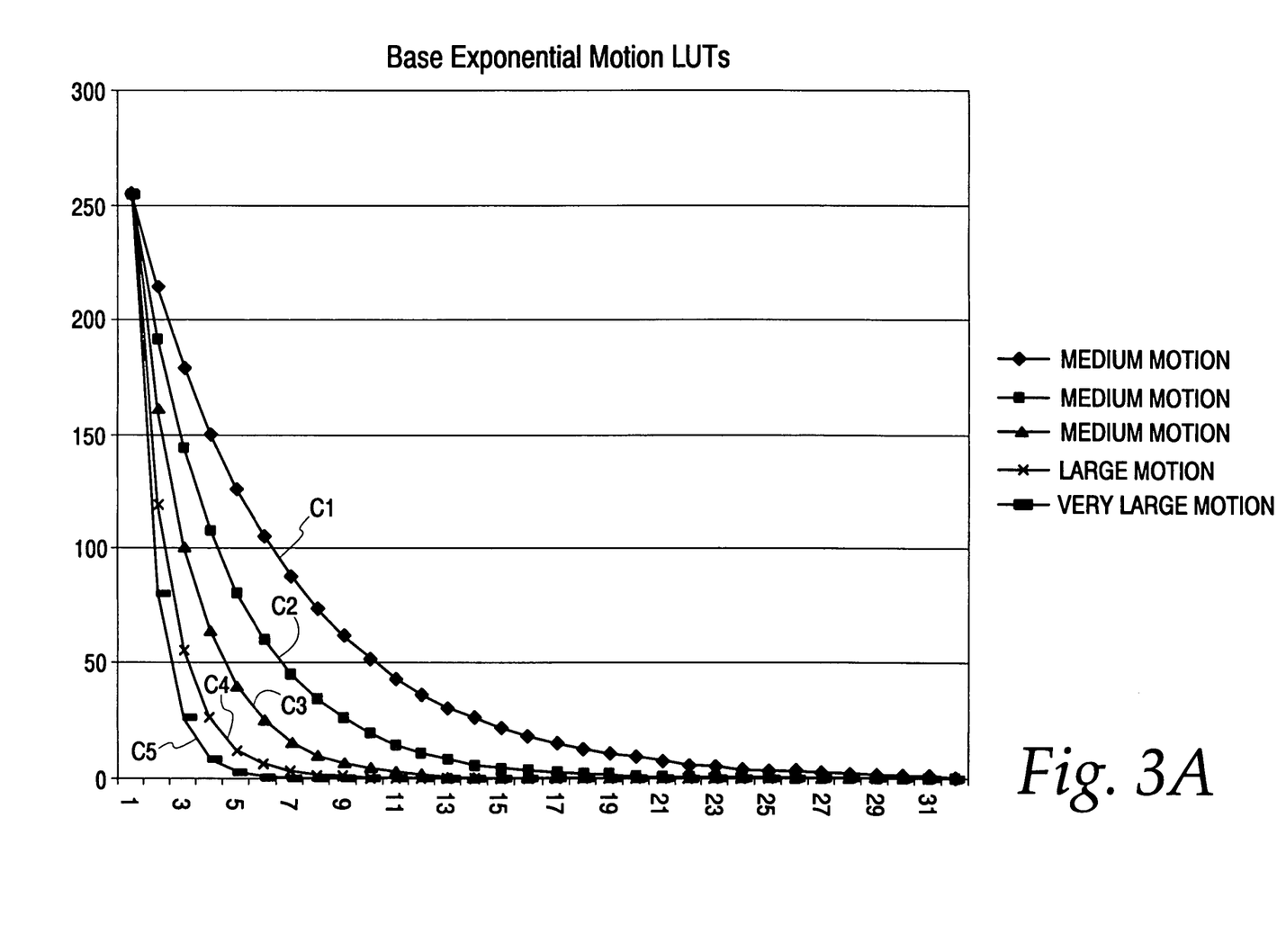
FIG. 3A is a graph illustrating embodiments of the programmable LUT shown in FIG. 2.

FIG. 3A shows a family of functions that have been successfully used for various types of input sequences. Notice that a curve with a base shape can be reduced in amplitude by means of the various adaptive gains (attenuators) in the system. The output of MLUT 362 must be in the range [0 . . . 255].

Figure 3B:
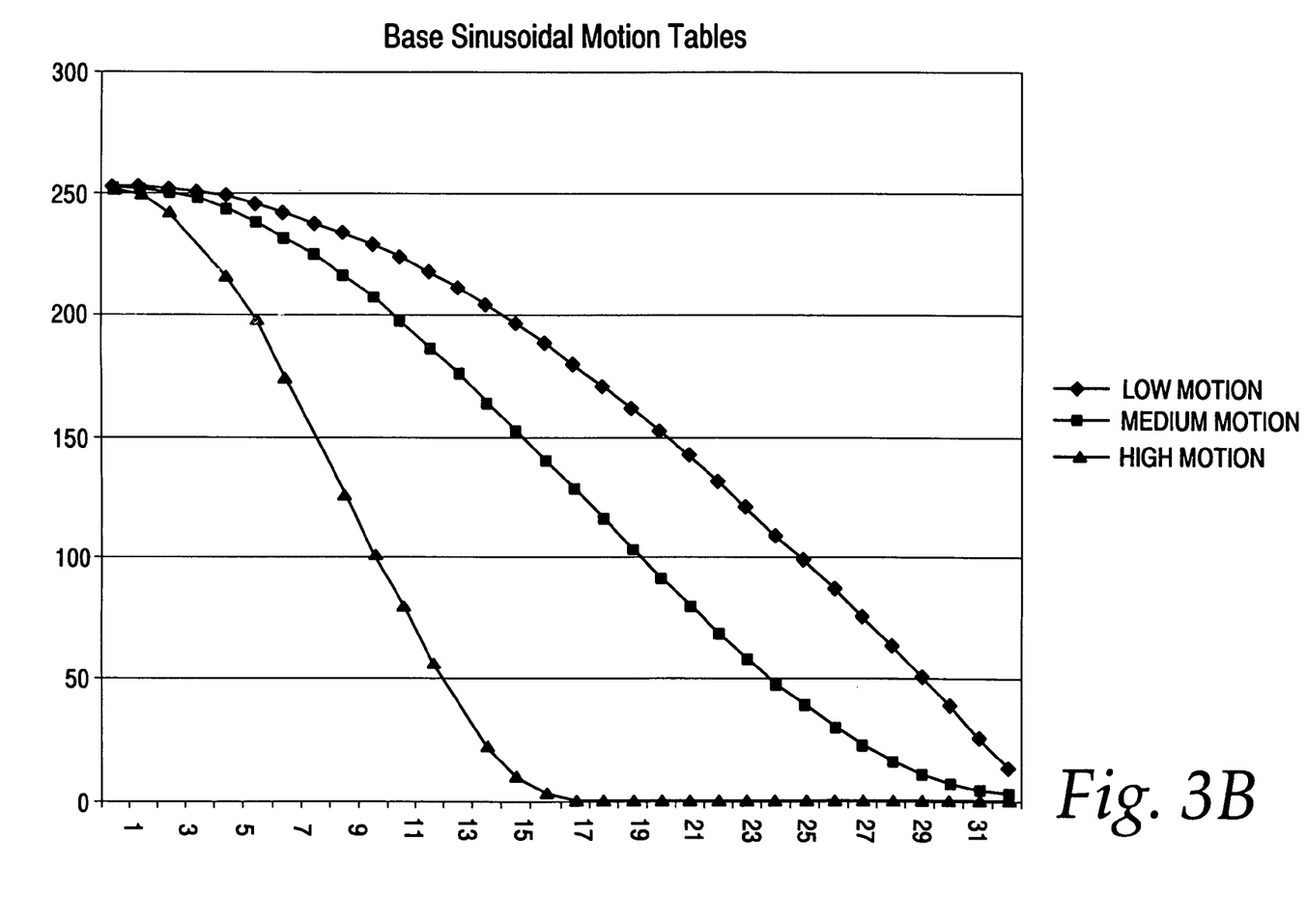
FIG. 3B is a graph illustrating additional embodiments of the programmable LUT shown in FIG. 2.

The motion look-up tables depicted in FIG. 3B also include sinusoidal versions, as well as the actual data used to generate them. The wider the curve, the more 'aggressive' it is in eliminating random noise. It is important for the curves to 'taper off' gradually as the input values increase to the maximum 32; otherwise motion artifacts can be generated in areas of similar—but not equal—amounts of motion.

Still referring to FIG. 3A, curve C1 is the most aggressive and curve C5 is the least aggressive. Curves C1-C5 represent various types of motion of images represented by pixels of the previous frame relative to motion of images represented by pixels of the current frame. More specifically, curves C1-C3 represent types of increasing medium motion, curve C4 represents large motion, and curve C5 represents very large motion.

LUT 362 generates first modified motion signals based on the curves representing the transfer functions. The edge signals from edge detector 364 are multiplied by first modified motion signals generated by LUT 362 in an arithmetic operator 366 to generate motion signals S.

Figure 4:
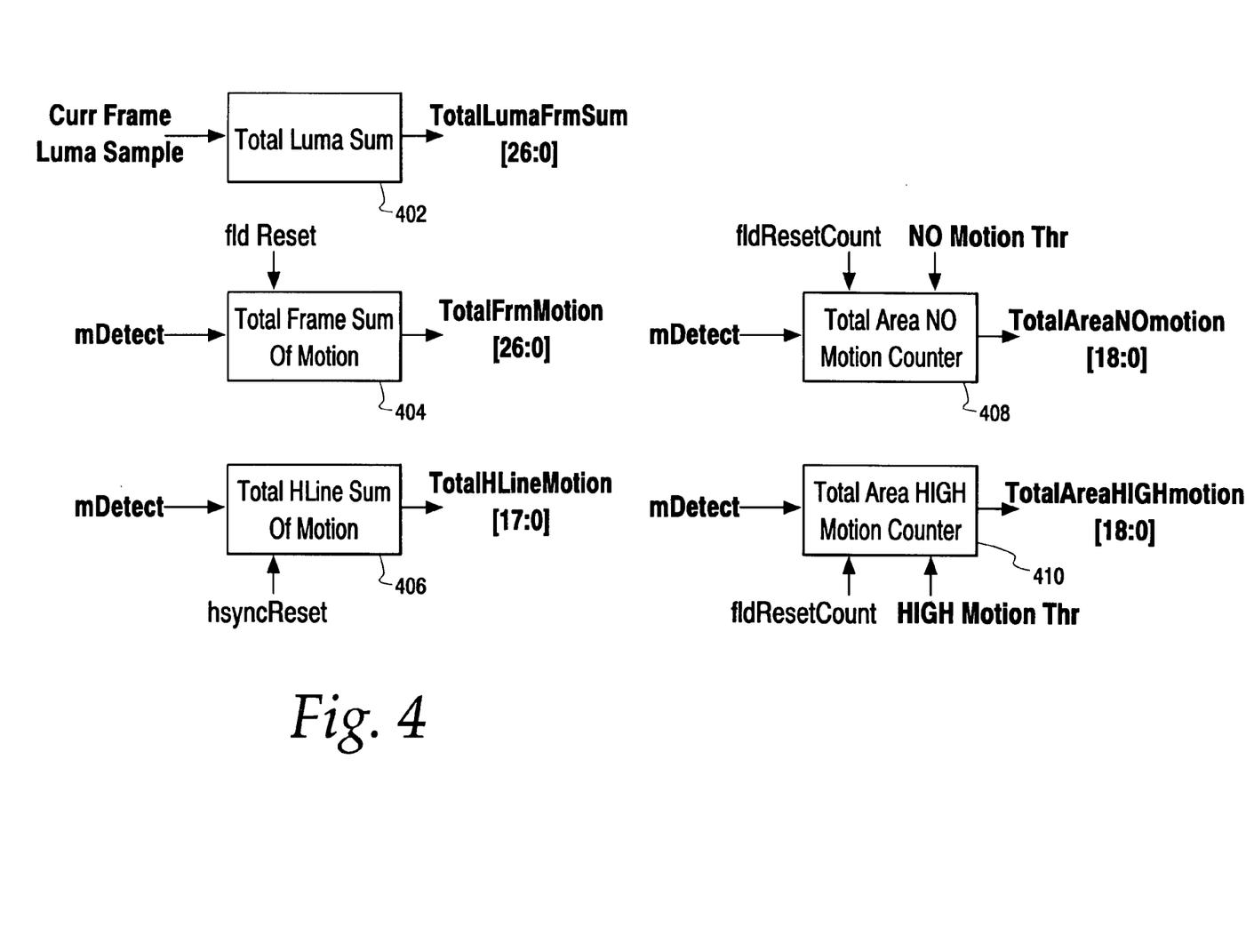
FIG. 4 is a schematic block diagram of the image characterization module shown in FIG. 1.

Throughout this specification, the term image sequence characterization is used to indicate the process of gathering information and making decisions based on video sequence information. The hardware involved for this task is essentially a set of accumulators and counters that keep track of various spatial and temporal data. FIG. 4 shows the signal widths needed for image resolution according to ITU-R656. Horizontal and vertical synchronization signals are used to reset and start accumulating/counting operations, but the values of the previously computed field or line remain stable for the duration of the current field or line until the next synchronization event.

TotalLumaFrmSum is calculated by a counter 402 that keeps track of the sum of all luma pixels in the current frame. This value is an early indication of the average DC value when scaled down by the total image size.

TotalFrmMotion is calculated by a counter 404 that adds the motion detection signal mDetect for the entire current frame. TotalHLineMotion is a horizontal line motion signal calculated by a counter 406 that adds the mDetect signals for the horizontal line above the current horizontal line that includes a pixel being processed. FIG. 4 indicates that counter 406 is reset at every vsync or every hsync of a frame. Firmware is responsible for reading the values at the appropriate interrupt before the counters are reset automatically by the hardware.

The area indicators TotalAreaNOmotion and TotalAreaHIGHmotion are calculated by counters 408 and 410, respectively. TotalAreaNOmotion is a low motion signal corresponding to motion of one or more images and TotalAreaHIGHmotion is a high motion signal corresponding to motion of one or more images. Counters 408 and 410 always count up by one as they are indicators of how many pixels fall within the threshold values indicated by the registers. At the end of each field, these registers contain an indication of how many pixels are at the extreme motion detection ranges indicated by the various thresholds. This information is used to globally change motion parameters, including the values of MLUT 362.

The overall operation of preprocessor system 10 will be described in the context of the interaction between hardware and firmware to provide motion detection.

The operation of preprocessor system 10 depends on the interaction between hardware and firmware. The hardware is set up by the firmware via control registers and under the assumption of an input video sequence of pixels on path 12 has mild noise reduction requirements. As the sequence progresses, the image characterization module 400 collects temporal and spatial features of the input sequence for the firmware to analyze. The firmware can determine after several frames have passed, more effective parameters for the noise reduction hardware.

As an example, for the recursive noise reduction process, the firmware may determine that the input video has very little global motion. This is indicated by low values for TotalFrmMotion (typically less than 10% of total frame motion), and at the same time a high value for TotalAreaNoMotion (better than 80% of total frame locations).

When there is a change of scene in the input sequence (e.g., a change in an image), it is possible that the change of scene is accompanied by very large change in overall picture brightness (high value of TotalLumaFrmSum), which would cause a detrimental blur effect if the recursive filter is operating with an "aggressive" MLUT 362. By reading this sudden change, the firmware can temporarily set the global MotionGain and uvMotGain registers to reduce, eliminate or partially disable the effect of the recursive filter 100 (FIG. 1) while the transition lasts.

Sudden large transitions in TotalFrmMotion towards zero (below 5% of total possible frame motion) and correlating spikes in the values of both TotalAreaNoMotion and TotalAreaHighMotion at specific intervals may indicate the existence of a 3:2 pull-down sequence. If sampled values of TotalHLineMotion confirm that there has been no significant line-to-line motion for the same frames, then this would be a further indication of repeated fields at the 3:2 cadence.

A rapid but progressive decrease in the value of TotalLumaFrmSum may indicate a fade-to-black video transition, especially if TotalAreaNoMotion remains fairly constant within the thresholds set for low/high motion.

The above-described embodiments enable a preprocessing system that is both effective and economical to determine motion of images represented by pixels and other digital data.

Each of the registers identified in FIGS. 2 and 4 is described in more detail in the following section.

Adaptive Motion Detection and Control

Motion Detection Setup Register

| Bit Field | Name | Description |
|---|---|---|
| 9:7 | MLPscale | Motion Horizontal Low Pass filter scale down factor. Implemented as a Shift Right operator of 3 bits. The filter coefficients are fixed. This gain helps extend the range of MLUT 362 |
| 6 | MedgeEnable | Enable horizontal motion edge detection |
| 5:3 | medgeThr | Motion edge detection threshold sensitivity. Range [0..28] Actual value used is: {medgeThr[2:0], 2'b00} |
| 2 | Width select | 0: most significant 5-bits (saturated) are stored 1: all the bits are stored in line buffer |
| 1 | Bypass MVF | Bypass vertical motion low pass filter |
| 0 | Bypass MHF | Bypass horizontal motion median filter |

Motion Look-Up Table Coefficients Register

Each write to this register writes 4-bytes of motion coefficients to the MLUT 362. The address is cleared to zero at each field synch. To write the entire table, 8 consecutive writes are required (4×8=32). After vsync reset, each read gets 4 coefficients at a time starting at location zero.

| Bit Field | Name | Description |
|---|---|---|
| 31:20 | MLUT3 | Coefficient 3 |
| 23:16 | MLUT2 | Coefficient 2 |
| 15:8 | MLUT1 | Coefficient 1 |
| 7:0 | MLUT0 | Coefficient 0 |

Image Characterization

The values in these registers remain valid for the duration of the current field and are changed only at vertical or horizontal sync, as the case may be. This way, the firmware can always read the value of the previous field at ay time. The status count registers should not overflow.

Sum of Luminance Register

| Bit Field | Name | Description |
|---|---|---|
| 26:0 | TotalLumaFrmSum | Adds all pixels in luma for the current frame |

Total Temporal Frame Register

| Bit Field | Name | Description |
|---|---|---|
| 26:0 | TotalFrmMotion | Adds all the motion detected between the current and previous frames |

Total Horizontal Line Motion Register

This register is double-buffered and guaranteed to always be ready by the firmware with stable values.

| Bit Field | Name | Description |
|---|---|---|
| 26:18 | HmotionLineCount | Indicates the horizontal line to which TotalHLineMotion belongs |
| 17:0 | TotalHLineMotion | Adds all the motion detected between line above in the current frame and the line above in the previous frame |

Total Area Containing No Motion Register

| Bit Field | Name | Description |
|---|---|---|
| 26:19 | NO Motion Threshold | All pixels with motion values detected below this threshold are considered static. |
| 18:0 | TotalAreaNoMotion | Counts all the pixel locations where there was no motion as indicated by the threshold value |

Total Area Containing High Motion Register

| Bit Field | Name | Description |
|---|---|---|
| 26:19 | HIGH Motion Threshold | All pixels with motion values detected above this threshold are considered largely moving. |
| 18:0 | TotalAreaHighMotion | Counts all the pixel locations where there was a lot of motion as indicated by the threshold value |

The foregoing embodiments offer the following advantages:

A motion signal is processed with a median operator to eliminate spurious temporal impulses in order to improve the effect of the temporal recursive filter;

A motion signal is examined for edges that represent moving boundaries of objects in order to properly control the time constant of the recursive filter and therefore prevent ghosting;

Dynamic control on a pixel-by-pixel basis allows fine grain control of filtering process;

Frame-based, field-correlated motion detection is simpler to implement than motion estimation;

Adaptivity based on motion detection is simpler and as effective as implementation using block motion estimation; and Motion detection is only performed on luminance and derived by correlation for chrominance.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. Apparatus for detecting motion represented by video pixels having digital pixel values comprising:

a memory arranged to store filtered pixel first values corresponding to first pixels processed by the apparatus during a first time period; and a motion detector responsive to differences between the first values and pixel second values corresponding to second pixels processed by the apparatus during a second time period later than the first time period to generate motion signals representing detected motion of images represented by the first pixels relative to motion of images represented by the second pixels, wherein the second pixels correspond to lines comprising a horizontal first line and a horizontal second line, wherein a pixel being processed lies in the first line, wherein the images define moving edges and wherein the motion detector comprises:

a third filter responsive to pixels in the first and second lines and responsive to the differences between the first values and the second values to generate initial motion signals representing an estimate of the detected motion of images; and a transfer function module arranged to generate the motion signals in response to the initial motion signals and characteristics of the images.

2. The apparatus of claim 1, wherein the apparatus further comprises an image sequence characterization module arranged to sum the initial motion signals for the second line to generate horizontal line motion signals, and wherein the transfer function module generates the motion signals in response to the horizontal line motion signals.

3. The apparatus of claim 1 wherein the transfer function module comprises a programmable module that modifies the initial motion signals in response to coefficients and wherein the apparatus further comprises an image sequence characterization module arranged to generate low motion signals having values derived from the second pixels corresponding to motion of one or more of the images less than a predetermined first threshold and to generate high motion signals having values derived from the second pixels corresponding to motion of one or more of the images greater than a predetermined second threshold, and wherein the coefficients are varied in response to at least one of the low motion signals and the high motion signals.

4. The apparatus of claim 1 wherein the second pixels correspond to an area defining a horizontal direction and a vertical direction, wherein the images represent moving edges and wherein the characteristics of the images comprise:

the proportion of the area representing one or more of the images with motion greater than a predetermined first threshold or less than a predetermined second threshold; and the relation of the pixel being processed to one or more of the moving edges.

5. The apparatus of claim 1 wherein the second pixels correspond to an area defining a horizontal direction and a vertical direction and wherein the transfer function module is arranged to generate the motion signals in response to the initial motion signals, in response to the second pixels corresponding to motion of one or more of the images beyond a threshold, and in response to the relationship of the pixel being processed to one or more of the moving edges.

6. The apparatus of claim 1 wherein the third filter comprises:

a horizontal filter module responsive to the differences between the first values and the second values and responsive to pixel values in the horizontal first line to generate horizontal filtered signals; and a vertical filter module responsive to the horizontal filtered signals and pixel values in the first and second lines to generate the initial motion signals.

7. The apparatus of claim 6 wherein the horizontal filter module comprises:

an absolute value operator arranged to generate absolute values corresponding to the differences between the first values and the second values;

a median filter arranged to generate median filtered values in response to the absolute values; and a finite impulse response filter responsive to the median filtered values to generate the horizontal filtered signals.

8. The apparatus of claim 7 wherein the second pixels correspond to an area defining a horizontal direction and a vertical direction and wherein the transfer function module comprises:

a look up table defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the look up table being arranged to generate first modified motion signals in response to the initial motion signals;

an edge detector responsive to the horizontal filtered signals to generate edge signals indicating one or more of the edges; and an arithmetic operator arranged to combine the edge signals with the first modified motion signals to generate the motion signals.

9. The apparatus of claim 8 wherein the edge detector comprises a high pass filter.

10. The apparatus of claim 6 wherein the second pixels correspond to an area defining a horizontal direction and a vertical direction and wherein the transfer function module comprises:

a look up table defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the look up table being arranged to generate first modified motion signals in response to the initial motion signals;

an edge detector responsive to the horizontal filtered signals to generate edge signals indicating one or more of the edges; and an arithmetic operator arranged to combine the edge signals with the first modified motion signals to generate the motion signals.

11. The apparatus of claim 10 wherein the arithmetic operator comprises a multiply operator.

12. The apparatus of claim 1 wherein the apparatus processes the pixels on a pixel-by-pixel basis.

13. The apparatus of claim 12 wherein the first values comprise a first frame of data and the second values comprise a second frame of data.

14. The apparatus of claim 13 wherein the differences between the first values and second values are derived from pixels in like positions of the first frame and second frame.

15. The apparatus of claim 1 wherein the pixel values comprise pixel luminance values.

16. A method of detecting motion represented by video pixels having digital pixel values comprising:

storing filtered pixel first values corresponding to first pixels processed during a first time period; and generating motion signals in response to differences between the first values and pixel second values corresponding to second pixels processed during a second time period later than the first time period, the motion signals representing detected motion of images represented by the first pixels relative to motion of images represented by the second pixels, wherein the second pixels correspond to lines comprising a horizontal first line and a horizontal second line, wherein a pixel being processed lies in the first line, wherein the images define moving edges and wherein the generating motion signals comprises:

generating initial motion signals representing an estimate of the detected motion of images in response to pixels in the first and second lines and responsive to the differences between the first values and the second values; and generating the motion signals in response to the initial motion signals and characteristics of the images.

17. The method of claim 16, wherein generating the motion signals comprises summing the initial motion signals for the second line to generate horizontal line motion signals and generating the motion signals in response to the horizontal line motion signals.

18. The method of claim 16 wherein generating the motion signals comprises modifying the initial motion signals in response to coefficients and wherein the method further comprises:

generating low motion signals having values derived from the second pixels corresponding to motion of one or more of the images less than a predetermined first threshold;

generating high motion signals having values derived from the second pixels corresponding to motion of one or more of the images greater than a predetermined second threshold; and varying the coefficients in response to at least one of the low motion signals and the high motion signals.

19. The method of claim 16 wherein the second pixels correspond to an area defining a horizontal direction and a vertical direction, wherein the images represent moving edges and wherein the characteristics of the images comprise:

the proportion of the area representing one or more of the images with motion greater than a predetermined first threshold or less than a predetermined second threshold;

the relation of the pixel being processed to one or more of the moving edges.

20. The method of claim 16 wherein the second pixels correspond to an area defining a horizontal direction and a vertical direction and wherein the generating the motion signals comprises generating the motion signals in response to the initial motion signals, in response to the second pixels corresponding to motion of one or more of the images beyond a threshold, and in response to the relationship of the pixel being processed to one or more of the moving edges.

21. The method of claim 16 wherein the generating initial motion signals comprises:

generating horizontal filtered signals in response to the differences between the first values and the second values and in response to pixel values in the horizontal first line; and generating vertical filtered signals corresponding to the initial motion signals in response to the horizontal filtered signals and pixel values in the first and second lines.

22. The method of claim 21 wherein the generating the horizontal filtered signals comprises:

generating absolute values corresponding to the differences between the first values and the second values;

generating median filtered values in response to the absolute values; and finite impulse response filtering the median filtered values to generate the horizontal filtered signals.

23. The method of claim 22 wherein the second pixels correspond to an area defining a horizontal direction and a vertical direction and wherein the generating the motion signals comprises:

defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the transfer function generating first modified motion signals in response to the initial motion signals;

generating edge signals indicating one or more of the edges in response to the horizontal filtered signals; and arithmetically combining the edge signals with the first modified motion signals to generate the motion signals.

24. The method of claim 23 wherein the generating edge signals comprises high pass filtering.

25. The method of claim 21 wherein the second pixels correspond to an area defining a horizontal direction and a vertical direction and wherein the generating the motion signals comprises:

defining a programmable transfer function altered in response to one or more of the extent to which the second pixels correspond to motion of one or more of the images less than a predetermined first threshold and the extent to which the second pixels correspond to motion of one or more of the images greater than a predetermined second threshold, the transfer function generating first modified motion signals in response to the initial motion signals;

generating edge signals indicating one or more of the edges in response to the horizontal filtered signals; and arithmetically combining the edge signals with the first modified motion signals to generate the motion signals.

26. The method of claim 25 wherein the arithmetically combining comprises multiplying.

27. The method of claim 16 comprising processing the pixels on a pixel-by-pixel basis.

28. The method of claim 16 wherein the first values comprise a first frame of data and the second values comprise a second frame of data.

29. The method of claim 28 wherein the differences between the first values and second values are derived from pixels in like positions of the first frame and second frame.

30. The method of claim 16 wherein the pixel values comprise pixel luminance values.

* * * * *

UNITED STATES PATENT AND TRADEMARK OFFICE
CERTIFICATE OF CORRECTION

PATENT NO. : 7,269,220 B2 Page 1 of 1
APPLICATION NO. : 10/196701
DATED : September 11, 2007
INVENTOR(S) : Jose Roberto Alvarez It is certified that error appears in the above-identified patent and that said Letters Patent is hereby corrected as shown below:

Column 12, line 45 delete "12" and insert --1--.

Signed and Sealed this

Eleventh Day of December, 2007

JON W. DUDAS
*Director of the United States Patent and Trademark Office*